3,032,550
ALLYLATED DIALDEHYDE STARCH AND
PROCESS FOR PREPARING SAME
Lewis A. Gugliemelli, Pekin, and Gary L. Mayer and
Charles R. Russell, Peoria, Ill., assignors to the United
States of America as represented by the Secretary of
Agriculture
No Drawing. Filed Feb. 11, 1960, Ser. No. 8,199
4 Claims. (Cl. 260—233.3)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention pertains to novel polymeric products comprising new allyl acetal derivatives of dialdehyde starch and to extremely durable and mar-proof, heat-dried protective coatings thereof. These uncured products are soluble in a diversity of organic solvents such as dioxane, methyl Cellosolve, acetone, methyl ethyl ketone, ethyl acetate, and pyridine. Cured films and coatings comprising the air-dried or heated allylated dialdehyde starch or our invention are highly resistant to water, moderately strong acids, salt solutions, absolute ethanol and other commonly encountered organic solvents such as acetone, dioxane, carbon tetrachloride, benzene, heptane, dichloroethane and ethyl alcohol. By virtue of their excellent resistance to an unusually extensive spectrum of solvents, organic solvent solutions of the uncured allylated dialdehyde starch polymers are eminently useful as superior substitutes for shellac on wood, glass, and metal surfaces, and for imparting a glossy waterproof finish to paper. Our products are also effective adhesives and unusually strong bonding agents for laminations of all kinds.

One of the first allyl carbohydrates, an ether derivative, to be employed as a protective coating material was allyl starch, U.S. 2,524,792 and U.S. 2,635,099. This was followed by the development of allyl dextrin, U.S. 2,676,172. These materials are prepared by the reaction of allyl chloride on starch or dextrin in alkaline medium at 80–90° C. in a pressure autoclave constructed of special alloys. However, these products failed to gain wide utility for their intended purpose because of two chief disadvantages: poor water resistance; and difficulties in manufacture due to the corrosive nature of allyl chloride (see Hyde: Ind. Eng. Chem. 48, 715 (1956)). The product of our invention differs from the above-described materials in preparation, chemical structure and physical properties.

Substantially fully oxidized dialdehyde starch (periodate-oxidized starch), the starting material of our product, is prepared according to methods taught by Dvonch et al., U.S. 2,648,692, and Mehltretter, U.S. 2,713,553, and is commercially available. It exists in granular form and possesses polymeric chains of amylose and amylopectin, whose repeating units have dialdehyde groups on the number 2 and 3 carbons, and a hydroxyl group on the number 6 carbon. In a preferred embodiment of our invention the allyl group is introduced into the dialdehyde starch by an acetal reaction involving allyl alcohol, in the presence of about one percent methanolic hydrogen chloride or sulfuric acid as a catalyst, at 40° C. or below, and at atmospheric pressure. Hence the use of corrosive allyl chloride and the need for high temperatures and expensive special alloy pressure vessels are avoided. We have discovered that allyl alcohol is practically unreactive with dialdehyde starch itself owing perhaps to its inability to penetrate and swell the granule structure. However, prereaction with methanol containing one percent hydrogen chloride, sulfuric acid, or other strong acid, gelatinizes the dialdehyde starch so that the allyl alcohol which is then added reacts with the now accessible dialdehyde groups and trans-acetylates any methyl acetals. We have further found that the rate and extent of reaction also depend upon the moisture content of the dialdehyde starch. For example, we found that periodate oxystarch (93 percent dialdehyde units) containing 9.6 percent moisture contained 0.010 mole of unreacted CHO per gram after 2 hours of allylation at 40° C. However, dialdehyde starch that had been dried to 1.5 percent moisture by heating in an oven at 100° C. for 30 minutes was found after reaction at 40° C. for 2 hours to contain only 0.0045 moles residual CHO gram of product, a more than two-fold increase of reaction.

Although we are still unable to set forth the exact structure of our allylated dialdehyde starch polymers, we have found by carbon and allyloxy analyses that they have an allyl D.S. of 1.8, with practically no residual free aldehyde groups as determined by the sodium borohydride method of Rankin et al., Anal. Chem. 26, 1012 (1956). Since the allyl D.S. of 1.8 is only about half that predictable on the basis of complete allylation of a dialdehyde starch having two free aldehyde carbons in nearly every unit, it is probable that our allylated dialdehyde starch also contains dioxane rings formed by acetal reaction involving the 6-hydroxyl and the 2 position aldehyde group as well as by interaction of the aldehyde group in the 2 position of one monomer unit with that in the 3 position of an adjacent unit. Also, furanosidic-type rings may be present by interaction of the number 6 hydroxyl and the aldehyde group in the 3 position. If the latter interaction were complete it would inherently reduce the theoretical D.S. by one. Guthrie et al., Chem. and Ind. 13, 388 (1958) and Goldstein et al., Chem. and Ind. 20, 595 (1958) have shown intra-acetal reactions with model dialdehyde in the presence of alcohols. Similar reactions, as suggested above probably occur in our synthesis.

Our allylated dialdehyde starch may be utilized to form protective coatings possessing good water resistance properties. Accelerated water resistance testing was carried out with boiling water. Dip coatings were made on Pyrex test tubes from 20 percent dioxane solutions of the allylated dialdheyde starch, and cured at 150° C. for one hour. Half the coating was immersed in boiling water and the tube was then removed from time to time to check for faults and blisters. The product described in Example 1 was resistant to boiling water from 1 to 1½ hours. The best prior art allyl starch coatings have a resistance to boiling water for only about 12 minutes (Talley et al., Agricultural and Industrial Chemistry 261 (1950)).

*Example 1*

Fifty grams of dialdehyde starch containing 93 percent dialdehyde units was dried in an oven for 30 minutes at 100° C. to a 1.5 percent moisture level. It was cooled and then placed in a 500 ml. round-bottom flask which was fitted with a stirrer. The flask was then immersed in a water bath that had been thermostated at 40° C. Fifty ml. of 1 percent methanolic hydrogen chloride was introduced and the mixture stirred for 30 minutes. At the end of this time the dialdehyde starch granules were swollen and had absorbed all the solvent. One hundred ml. of allyl alcohol was added to the reaction mixture along with 50 ml. of 3 percent dioxane hydrogen chloride, thus making the total liquid concentration 1 percent with respect to hydrogen chloride. The reaction was allowed to continue for 24 hours. The product was precipitated by pouring the reaction mixture into a liter of cold water and then filtering on a Büchner funnel. Washing was continued until the product was free of allyl alcohol. It was vacuum dried to a 2 percent moisture content. A 100 percent yield was obtained. *Analysis.*—C, 52.42%; H, 6.45%; allyloxy 33.3%; moles CHO per gram of product, 0.0007. The fine, white free-flowing powder obtained after grinding the above product was stirred into 4 volumes of dioxane. Other usable solvents were found to be acetone, methyl Cellosolve, methyl ethyl ketone and pyridine. The resulting 20 percent solution in dioxane having a viscosity of 2.96 poises at 25° C. was then poured upon a surface to form a film. Obviously, articles may be impregnated or coated by dipping. Upon evaporation of the solvent at room temperature, the film was cured by mold baking, which causes the unsaturated allyl groups to cross-link and form a substantially insoluble film.

*Example 2*

Fifty grams of 93 percent dialdehyde starch was dried in the same manner as described in Example 1 and reacted in a similar apparatus with 50 ml. of 1 percent methanolic hydrogen chloride for 30 minutes at 40° C. Similarly, as in Example 1, 100 ml. of allyl alcohol and 50 ml. of 3 percent dioxane hydrochloride was added to the mixture. The reaction was allowed to proceed for 6 hours and at the end of this time the product was isolated and dried in the manner described previously. The dry product so obtained was reacted further by first swelling it in 50 ml. of 2 percent dioxane and then adding 50 ml. of allyl alcohol. This reaction was carried out for an additional 6 hours. The final product which resulted was isolated and dried in the manner described previously in Example 1. A weight yield based on dialdehyde starch, of 120 percent was achieved. *Analysis.*—C, 52.1%; H, 7.35%; allyloxy, 34.6%; moles of aldehyde per gram, 0.0001. The solubility of this material was the same as that for Example 1. Films of this product cured at 150° C. where found to be resistant to boiling water from 1 to 1.5 hours. The viscosity of a 20-percent solution in dioxane at 25° C. was 1.25 poises.

*Example 3*

A procedure similar to the one described in Example 1 was carried out on 50 grams of 93 percent dialdehyde starch (1.5 percent moisture); however, the temperature of the reaction was kept at 30° C. The reaction time was 24 hours and the product was isolated in the manner previously described. *Analysis.*—C, 48.17; H, 6.42; allyloxy, 33.8; moles CHO per gram, 0.0024. The viscosity of a 20-percent solution in dioxane was 0.66 poise.

*Example 4*

A procedure similar to the one described in Example 1 was carried out with 50 grams of 93 percent dialdehyde starch (1.5 percent moisture). The temperature of the reaction was 30° C.; however, the hydrogen chloride concentration was 2 percent. The reaction was continued for 24 hours and the isolation of the product was made in the manner previously described. *Analysis.*—C, 49.10; H, 6.39; alloyloxy, 37.4; moles CHO per gram, 0.001. The viscosity of a 5 percent solution in dioxane at 25° C. was found to be 35 poises.

Having disclosed our invention, we claim:

1. The method of treating periodate oxidized starch at least 93 percent of which is in the dialdehyde form comprising the steps of heat-drying said periodate oxidized starch to a moisture content of not above about 1.5 percent, gelatinizing the essentially moisture-free granules with about a one percent solution of hydrogen chloride in methanol, reacting said gelatinized granules at a temperature of not above 40° C. with allyl alcohol in the presence of dioxane at an HCl concentration of about one percent based on the total liquid, precipitating the product in cold water, and washing until free of allyl alcohol.

2. The method which comprises gelatinizing periodate oxidized starch at least 93% of which is in the dialdehyde form with about a 1% solution in methanol of a strong mineral acid and then reacting said gelatinized periodate oxidized starch with allyl alcohol at a temperature of not above about 40° C. in the presence of about 1% hydrogen chloride based on the total liquid.

3. The method which comprises gelatinizing periodate oxidized starch at least 93% of which is in the dialdehyde form with about a 1% solution of methanolic hydrogen chloride and then reacting said gelatinized periodate oxidized starch with allyl alcohol at a temperature of not above about 40° C. in the presence of about 1% hydrogen chloride based on the total liquid.

4. The allyl acetal of dialdehyde starch, the dialdehyde starch starting material of which has been oxidized to the extent of at least 93 percent of theory, said allyl acetal having an average allyl D.S. of 1.8–2.0 and being the product produced by the process of claim 1.

References Cited in the file of this patent

UNITED STATES PATENTS

| | | |
|---|---|---|
| 2,602,789 | Schwartz et al. | July 8, 1952 |
| 2,606,188 | Yelland | Aug. 5, 1952 |
| 2,671,781 | Gaver et al. | Mar. 9, 1954 |
| 2,698,255 | Kass | Dec. 28, 1954 |
| 2,707,689 | Wilde | May 3, 1955 |
| 2,887,399 | Rickert | May 19, 1959 |
| 2,894,945 | Hofreiter et al. | July 14, 1959 |

OTHER REFERENCES

Paper Trade Journal, April 6, 1950, pages 48 and 49.
Goldstein et al.: "Chemistry and Industry," January 11, 1958, pages 40–42.

UNITED STATES PATENT OFFICE
CERTIFICATE OF CORRECTION

Patent No. 3,032,550                                   May 1, 1962

Lewis A. Gugliemelli et al.

It is hereby certified that error appears in the above numbered patent requiring correction and that the said Letters Patent should read as corrected below.

Column 2, line 14, after "CHO" insert -- per --; column 3, line 13, for "mold" read -- mild --.

Signed and sealed this 4th day of September 1962.

(SEAL)
Attest:

ERNEST W. SWIDER                               DAVID L. LADD
Attesting Officer                                    Commissioner of Patents